(12) United States Patent
Cui et al.

(10) Patent No.: US 12,672,082 B2
(45) Date of Patent: Jun. 30, 2026

(54) METHODS FOR ALLOCATING PRECONFIGURED RESOURCES

(71) Applicant: ZTE Corporation, Shenzhen (CN)

(72) Inventors: Fangyu Cui, Shenzhen (CN); Nan Zhang, Shenzhen (CN); Jianqiang Dai, Shenzhen (CN); Wei Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 322 days.

(21) Appl. No.: 18/220,045

(22) Filed: Jul. 10, 2023

(65) Prior Publication Data

US 2023/0354233 A1 Nov. 2, 2023

Related U.S. Application Data

(63) Continuation of application No. PCT/CN2021/072194, filed on Jan. 15, 2021.

(51) Int. Cl.
*H04W 64/00* (2009.01)
*H04W 56/00* (2009.01)
(52) U.S. Cl.
CPC ....... *H04W 56/0045* (2013.01); *H04W 64/00* (2013.01)
(58) Field of Classification Search
CPC . H04W 4/029; H04W 56/0045; H04W 64/00; H04W 72/23
See application file for complete search history.

(56) References Cited

U.S. PATENT DOCUMENTS

| | | | |
|---|---|---|---|
| 2013/0308610 A1 | 11/2013 | Bergstrom et al. | |
| 2015/0173028 A1 | 6/2015 | Dinan | |
| 2015/0270890 A1* | 9/2015 | Vasavada | H04B 7/1851 |
| | | | 370/326 |
| 2017/0331577 A1 | 11/2017 | Parkvall et al. | |
| 2020/0107283 A1* | 4/2020 | Ratasuk | H04L 27/2646 |
| 2021/0281520 A1* | 9/2021 | Shrestha | H04W 56/0045 |
| 2022/0159741 A1* | 5/2022 | Hoang | H04W 74/0833 |

FOREIGN PATENT DOCUMENTS

| | | |
|---|---|---|
| CN | 105474673 A | 4/2016 |
| WO | WO-2020/198671 A1 | 10/2020 |

OTHER PUBLICATIONS

International Search Report and Written Opinion for PCT Appl. No. PCT/CN2021/072194, mailed Oct. 11, 2021 (10 pages).
(Continued)

*Primary Examiner* — Sam Bhattacharya
(74) *Attorney, Agent, or Firm* — Foley & Lardner LLP

(57) ABSTRACT

Systems, apparatus and methods for wireless communication are described, and more specifically, to techniques related to managing preconfigured resources. One example method for wireless communication includes determining, by a wireless device configured to communicate with a network device using preconfigured transmission resources, a timing adjustment value for communication with the network device using a mode in which the timing adjustment value is determined at least partly based on autonomous estimation by the wireless device and causing the wireless device to perform a transmission using the timing adjustment value.

19 Claims, 13 Drawing Sheets

(56) References Cited

OTHER PUBLICATIONS

Extended European Search Report for EP Appl. No. 21918567.5, dated Aug. 30, 2024 (17 pages).
Interdigital (Email Discussion Rapporteur), "Summary of [Post111-e][908][NTN] RACH and HARQ feedback aspects", e3GPP RAN WG2 Meeting #112e, R2-2010455, Nov. 13, 2020 (49 pages).
OPPO, "Discussion on RACH in NTN", 3GPP TSG-RAN WG2 Meeting #112 electronic, R2-2009107, Nov. 13, 2020, Online (6 pages).
Office Action for KR Appl. No. 10-2023-7024205, dated Aug. 18, 2025 (with English translation, 14 pages).
Final Rejection for KR Appl. No. 10-2023-7024205, dated Feb. 5, 2026 (with English translation, 6 pages).
First Office Action for CN Appl. No. 202180089616.9, dated Jan. 19, 2026 (with English translation, 6 pages).

* cited by examiner

Determine a preconfigured resource to use for transmission according to a rule.
302

Perform a transmission based on the preconfigured resource.
304

300

Transmit a request based on an operational parameter. 402

Receive a second configuration of preconfigured resources. 404

Perform a transmission using resources from the second configuration responsive to an event. 406

400

Determine a preconfigured resource to use for transmission according to a rule.
502

Perform a transmission based on the preconfigured resource.
504

500

600

Determine a timing adjustment value using a mode in which the timing adjustment value is determined at least partly based on autonomous estimation.
802

Perform a transmission using the timing adjustment value.
804

800

Receive a transmission.
902

Determine a timing adjustment value using a mode in which the timing adjustment value is determined at least partly based on autonomous estimation and using the transmission.
904

Perform a transmission using the timing adjustment value.
906

900

Receive an indication that a mode has been activated for use.
1002

Determine a timing adjustment value using the mode in which the timing adjustment value is determined at least partly based on autonomous estimation.
1004

Perform a transmission using the timing adjustment value.
1006

1000

Receive an indication in a broadcast message from a network device that a mode has been activated for use.
1102

Determine a timing adjustment value using the mode in which the timing adjustment value is determined at least partly based on autonomous estimation.
1104

Perform a transmission using the timing adjustment value.
1106

1100

METHODS FOR ALLOCATING PRECONFIGURED RESOURCES

CROSS-REFERENCE TO RELATED APPLICATION

This application claims the benefit of priority under 35 U.S.C. § 120 as a continuation of International Patent Application No. PCT/CN2021/072194, filed on Jan. 15, 2021, the disclosure of which is incorporated herein by reference in its entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society.

SUMMARY

This document relates to methods, systems, and devices for allocating preconfigured resources in mobile communication technology, including 5th Generation (5G), and new radio (NR) communication systems.

In one exemplary aspect, a wireless communication method is disclosed. The method includes determining, by a wireless device configured to communicate with a network device using preconfigured transmission resources, a timing adjustment value for communication with the network device using a mode in which the timing adjustment value is determined at least partly based on autonomous estimation by the wireless device. The method also includes causing the wireless device to perform a transmission using the timing adjustment value.

In another exemplary aspect, a wireless communication method is disclosed. The method includes receiving, by a user device configured to perform transmissions according to a first configuration of preconfigured resources used for transmission; a second configuration of preconfigured resources used for transmission. The method also includes performing communication by the user device using resources from the second configuration of preconfigured resources used for transmission responsive to occurrence of an event.

In another exemplary aspect, a wireless communication method is disclosed. The method includes determining, by a user device configured to perform transmissions according to one of multiple configurations of preconfigured resources, a preconfigured resource to use for transmission according to a rule. The method also includes performing a transmission to a network based on the preconfigured resource determined according to the rule.

In another exemplary aspect, a wireless communication method is disclosed. The method includes performing, by a wireless device configured to communicate with a network device, one or more measurements, each measurement of the one or more measurements associated with a transmission resource of one or more transmission resources. The method also includes transmitting a report including results of the one or more measurements to the network device.

In another exemplary aspect, a wireless communication method is disclosed. The method includes transmitting, by a network device to a wireless device configured to communicate with the network device using preconfigured transmission resources, a timing adjustment information using which the wireless device determines a timing adjustment value based on autonomous estimation by the wireless device. The method also includes receiving from the wireless device a transmission that uses the timing adjustment value.

In another exemplary aspect, a wireless communication method is disclosed. The method includes transmitting, by a network device to a user device configured to perform transmissions according to a first configuration of preconfigured resources used for transmission, a second configuration of preconfigured resources used for transmission, wherein the second configuration of preconfigured resources used for transmission includes resources usable by the user device to perform communication responsive to occurrence of an event.

In another exemplary aspect, a wireless communication method is disclosed. The method includes transmitting, by a network device to a user device configured to communicate with the network device using one of multiple configurations of preconfigured resources, an indication using which the wireless device determines a preconfigured resource to use for transmission. The method also includes receiving, from the wireless device, a transmission that uses the preconfigured resource.

In another exemplary aspect, a wireless communication method is disclosed. The method includes receiving, from a wireless device configured to communicate with a network device, a report including results of one or more measurements, each measurement of the one or more measurements associated with a transmission resource of one or more transmission resources. The method also includes determining, based on the report, a serving resource to use for transmission to the wireless device.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems In future communication systems, support for high mobility scenarios is crucial, e.g., for non-terrestrial networks (NTNs), high-speed trains (HSTs), etc. In these cases, user equipment (UE) may move quickly relative to a base station (B S), resulting in frequent beam switching. As a result, there will be problems when applying configured grant (CG) in new radio (NR) or preconfigured uplink resource (PUR) in narrowband internet of things (NB-IoT) or enhanced machine-type communication (eMTC). For example, UEs are configured with periodic resources for grant-free uplink (UL) transmission in CG and PUR. If beam switching happens frequently, a UE may require frequent resource updates, resulting in a need for high signaling overhead. Moreover, in PUR, timing advance (TA) for a current UL transmission is updated in the acknowledgment (ACK) of the previous UL transmission. Since the period between UL transmissions in PUR is large, the TA can easily expire in a high mobility scenario. Embodiments of the present disclosure consider how to handle frequent beam switches and updating parameters in CG and PUR.

Figure 1:
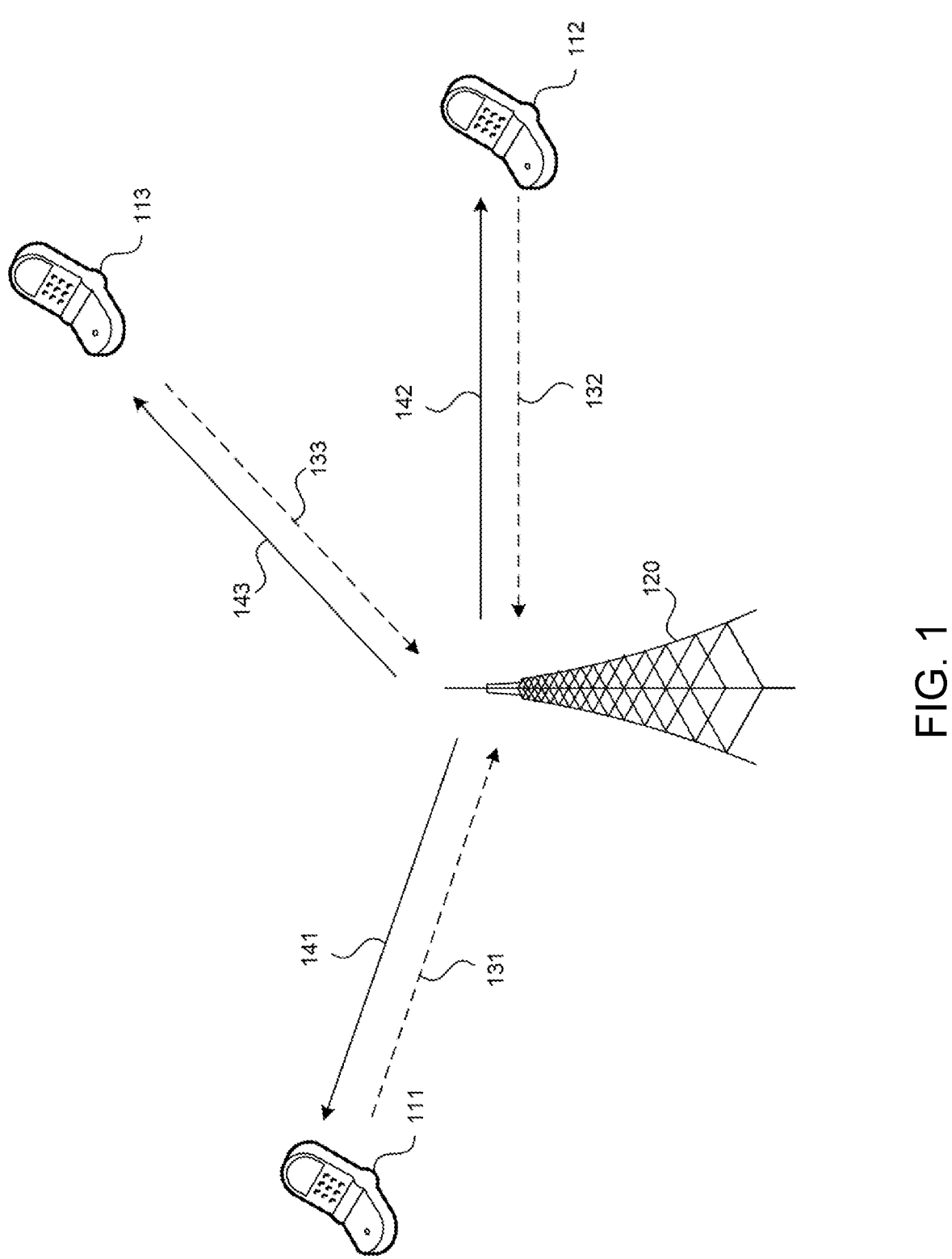
FIG. 1 shows an example of a base station (BS) and user equipment (UE) in wireless communication.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP NR network architecture and 5G protocol only to facilitate understanding and the disclosed techniques and embodiments may be practiced in other wireless systems that use different communication protocols than the 3GPP protocols.

Non-Terrestrial Networks

In NTNs, ground UEs can be served by aerial vehicles, e.g., satellites and high altitude platform stations (HAPS). This architecture is very attractive since it is able to cover devices in remote areas.

For low-earth orbit (LEO) satellites, their speed can be several kilometers per second and resulting in high delay variation. Moreover, there are two cases for beam coverage:

(1) Earth fixed coverage: the satellite steers its beam to cover a fixed area on Earth. In this case, the period of beam switch can generally be a few minutes.

(2) Earth moving coverage: the beam is fixed so that its coverage moves along with the satellite. In this case, the period of beam switch could be shorter than 20 seconds.

Figure 2:
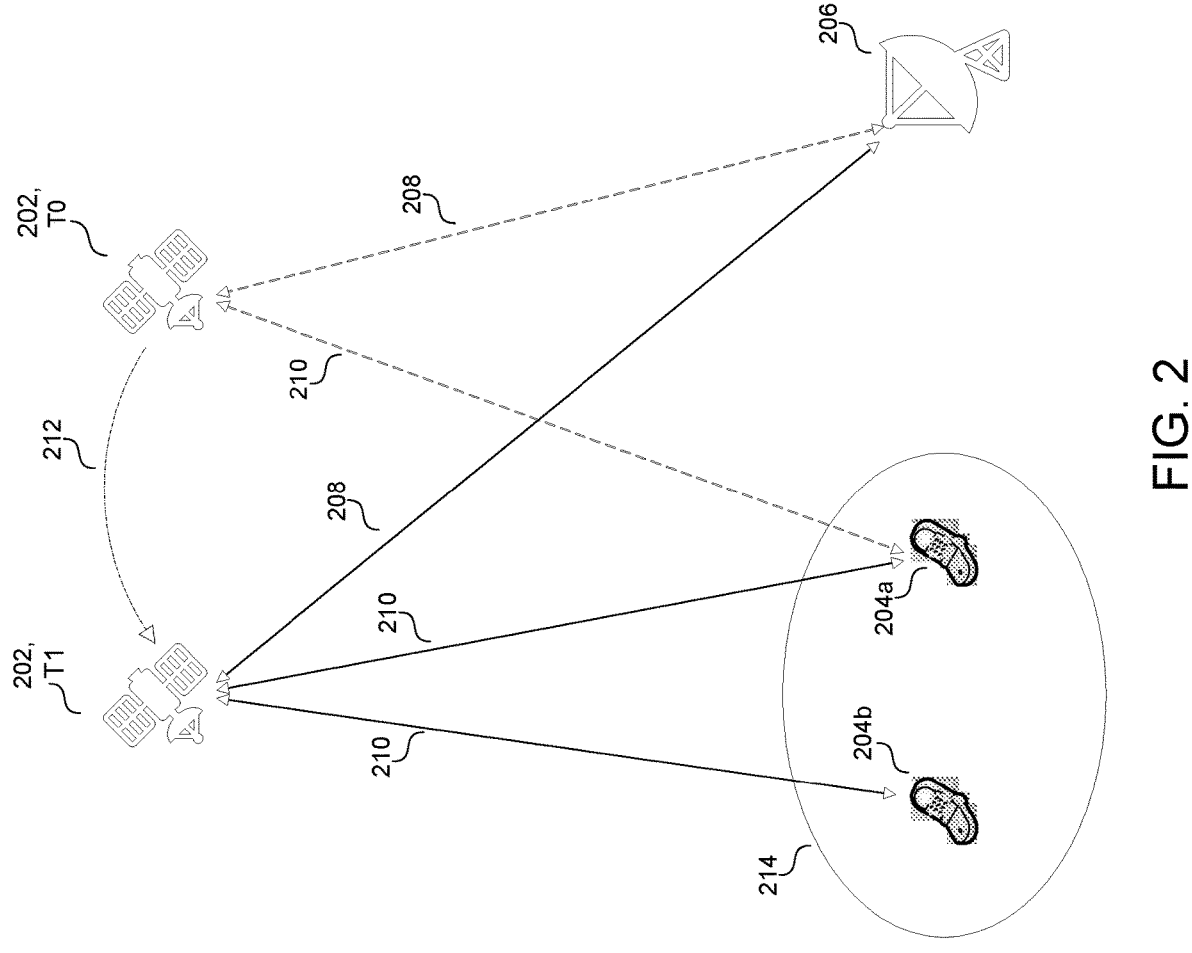
FIG. 2 shows an example non-terrestrial network.

FIG. 2 shows an example non-terrestrial network. The network includes a satellite 202 and UEs 204a and 204b being able to communicate with the satellite 202 via a wireless service link 210. The UEs 204a and 204b can be operating in the network 1600 that includes a satellite cell 214 with a corresponding coverage footprint. The satellite 202 can be communicatively connected with an earth station 206 via a feeder link 208. The feeder link can carry messages to/from the UEs 204a and 204b being served by the satellite 202. The earth station 206 can be communicatively connected with a core wireless network such as a 5G core network. Accordingly, messages to the UEs 204a and 204b from the 5GC network can travel over the earth station 206 to the satellite 202, and then from the satellite 202 to the UEs 204a and 204b. Similarly, messages from the UEs 204a and 204b can travel over the service link 210 to the satellite 202, then from the satellite 202 over feeder link 208 to the earth station 206, and then from the earth station 206 to the 5GC network.

As shown, the satellite 202 can move across a trajectory 212 relative to the earth from a time T0 to a time T1. For a earth-fixed LEO satellite, the satellite cell 214 maintains the same coverage footprint on Earth as the satellite 202 moves across trajectory 212. But as the satellite 202 moves, the communications between the satellite 202 and a UE 204 can vary. For example, as shown in FIG. 2, the angle at which a UE 204a is connected to satellite 202 via wireless service link 210 changes, which can result in a beam switch and require a resource update at UE 204a. In another example, the UE 204b is not communicatively connected to the satellite 202 via wireless communication link 210 at time T0, but is connected at time T1. The distance between the satellite 202 and the UE 204 can also vary, affecting propagation delay. This can, for example, require an adjustment to a TA value of a UE 204a.

Configured Grant

In NR, a BS can configure periodic resources to a UE. Then, after activation, the UE can perform UL transmission of these resources without a UL grant from BS, which reduces signaling overhead and latency. The period of CG transmission can vary from 2 symbols to 640 subframes. There are two types of CG:

(1) Type 1: Pure radio resource control (RRC) configuration. In this case, the physical uplink shared channel (PUSCH) transmission can be semi-statically configured to operate upon the reception of a higher layer parameter of configuredGrantConfig, including rrc-ConfiguredUplinkGrant, without the detection of an UL grant in a DCI. Note that a UE can be configured with multiple CG resources simultaneously including those on non-active bandwidth parts (BWPs). Therefore, even when a BWP switches, there may still be available CG resources for the UE.

(2) Type 2: Downlink control information (DCI) activation. In this case, only part of parameters, such as repetition and periodicity, are configured through RRC signaling. The activation/deactivation of CG and some other parameters, e.g., time resource allocation, are configured through DCI. Since DCI can only activate and configure CG resources on active BWPs, reconfiguration can be needed when BWP switches.

Preconfigured UL Resource

In eMTC and NB-IoT, a BS can preconfigure the transmission resources and parameters to a UE via RRC signaling. Then, the UE could perform UL transmission in PUR occasions without a UL grant from the BS. After UL transmission, the UE can detect a physical downlink control channel (PDCCH) from the BS in a time window (i.e., search space window) for feedback. The feedback may contain the updated PUR parameters, e.g., TA and repetition number, for later UL transmissions.

With PUR, a UE can transmit data immediately in idle mode without a random access channel (RACH) procedure and scheduling. As a result, the signaling overhead and transmission latency are reduced. Moreover, a UE could stay in idle mode for longer times so that power consumption can also be reduced.

The large interval between PUR occasions is one main problem. From 3GPP TS 36.331, the minimum period between PUR occasions is 8 hyper frames (81.92 s), which is a long time in scenarios such as LEO NTN. The UE may experience significant TA variation and even beam switch between two PUR transmissions. As a result, the updated parameters after a previous PUR transmission can very likely be expired at later PUR occasions. Resource reconfiguration is also needed when a beam switch happens, which is similar to CG.

Embodiment 1

Generally, beams are bound with different BWPs. Therefore, reconfiguration of CG resources is needed when a UE experiences a beam switch, since CG resources are configured on active BWPs when type 2 CG is applied. In high mobility scenarios, a beam switch can occur in a very short time period. As a result, there will be frequent CG reconfigurations when type 2 CG is applied, which increases signaling overhead. Moreover, if autonomous beam switching triggered by a UE is allowed, reconfiguration of CG also increases the latency.

In order to reduce signaling overhead from CG reconfiguration, a relative frequency resource can be configured instead of an absolute frequency resource. For example, a UE can be configured with a relative frequency domain resource in DCI, e.g., the second resource block (RB) of each BWP. When the UE switches to a new beam, the second RB of the new BWP can be autonomously chosen as the new frequency domain resource for the following CG transmissions. The activation of CG is kept after a BWP switch so that the signaling for reconfiguration is saved.

Figure 3:
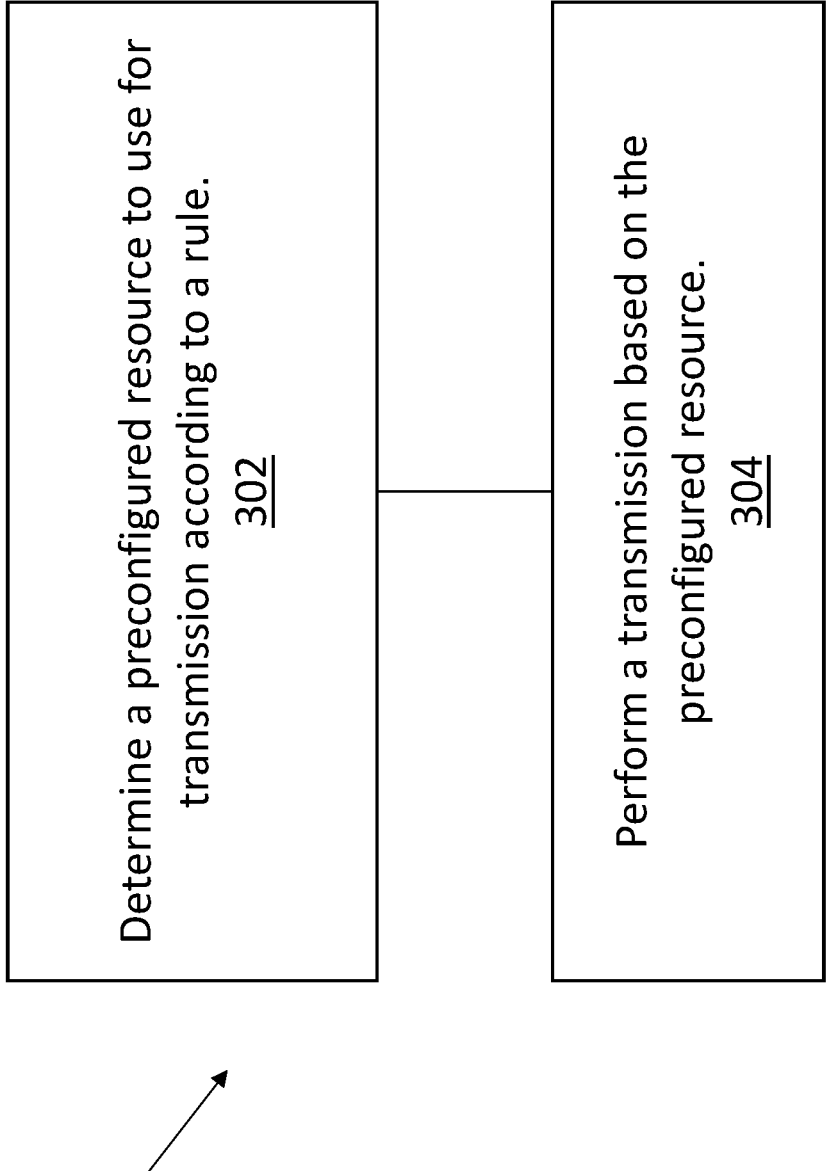
FIG. 3 shows an example method to allocate a CG resource.

FIG. 3 shows an example method 300 to allocate a CG resource. At step 302, a UE can determine a preconfigured resource to use for transmission according to a rule. The preconfigured resources can comprise CG resources. The preconfigured resources be configured via physical layer signaling. The preconfigured resources can be configured according to a relative frequency domain parameter, for example the second RB of each BWP. The rule can specify that the determining is performed in response to switching to a new serving resource, such as a beam switch. At step 304, a UE can perform a transmission based on the preconfigured resource.

Note, configuring multiple CG resources on other non-active BWPs to one UE may not result in decreased capacity, since CG resources can naturally be configured for group UEs. Therefore, even if a UE is configured with unused CG resources, other UEs can still utilize the resource so that the resources will not be wasted.

Embodiment 2

PUR allows grant free UL transmission for IoT UEs, similar to CG. However, there are some differences. The first difference is that the period between PUR occasions is at least 80 seconds, which is much longer than CG. Therefore, beam switching is more likely to happen during the interval between two PUR transmissions than for CG. The second difference is that IoT UEs usually apply discontinuous reception (DRX) or Half Duplex Frequency Division Duplex (HD-FDD) to save energy, so the UE cannot receive DL signals at any time. That is, the UE may often be in a sleep or idle mode and not able to obtain a new parameter right at the moment when the UE moves into coverage of a new beam. As a result, when to update PUR parameters should also be considered.

Similar to NR, beams are generally bound with different frequency resources in NB-IoT/eMTC. When a UE experiences a beam switch, its allocated PUR resource may expire. Even if the UE switches to a new beam which uses the same frequency resource as the prior beam, collisions could happen when a dedicated PUR is configured. In traditional terrestrial networks, beam switching is handled by a fallback to RACH/early data transmission (EDT) and reconfiguring PUR after initial access, since IoT devices are generally static and beam switching rarely happens. But in high mobility scenarios, such as NTN scenarios, beam switching happens more frequently, so a UE would need to perform RACH every few PUR occasions, which leads to high signaling overhead. Therefore, handling the PUR resource update without a fallback to RACH/EDT should be considered.

Case 1: Methods to Handle Beam Switch with Fewer Fallback

Option 1: Update a PUR resource. A UE can be configured with an updated PUR resource to handle a beam switch with proper prediction. For example, if the UE detects that its elevation angle decreases below a certain threshold in a current UL transmission, it will know that a beam switch could happen in the near future and request new parameter in advance. When the UE switches to a new beam, it can utilize the newly configured PUR resource for UL transmission instead of requiring a fallback to RACH/EDT. However, if the UE finds that there is no feasible PUR resource for the current transmission, e.g., when the UE skips several PUR occasions such that the parameter update is not timely performed, a fallback to RACH/EDT is still needed.

Figure 4:
FIG. 4 shows an example method to update a CG resource.

FIG. 4 shows an example method 400 to update a PUR resource. At step 402, a UE can transmit a request based on an operational parameter. The request can be transmitted using a first configuration of preconfigured resources, such as a PUR transmission. The operational parameter can comprise an elevation angle of the UE, and the request can be made due to detecting the elevation angle being below a threshold level, which can indicate an upcoming beam switch. At step 404, the UE configured to perform transmissions using the first configuration of preconfigured resources can receive a second configuration of preconfigured resources used for transmission. The second configuration can be received in response to the request from step 402, such as in a feedback to a PUR transmission. At step 406, the UE can perform a transmission using resources from the second configuration responsive to the occurrence of an event. The event can comprise a serving resource switch, such as a beam switch. If the UE does not receive a suitable second configuration at step 404, it can perform a fallback to RACH/EDT.

Option 2: Pre-allocate resources for future beams. This method is similar to that for CG in NR, which aims to reduce the frequency of parameter reconfigurations or updates. Two sub-options are listed as follows:

Sub-option 2-1: Configure multiple PUR resources. A UE can be configured with multiple PUR resources, including resources corresponding to beams which a UE may switch to. When the UE is switched to a new beam, it can search among the multiple PUR resources and select a proper resource for UL transmission. If the UE finds that there is no feasible PUR resource for the current transmission, it will fall back to RACH/EDT. Note that the PUR resources in new beam may be contention-free shared (CFS) resources, which both increases the capacity and reduces collision probability.

Sub-option 2-2: Configure relative frequency resources instead of absolute frequency resources. A UE can be configured with a relative frequency domain resource in each group of frequency resources. When the UE switches to a new beam, the frequency resource at the same relative position in the new frequency resource group will autonomously be chosen for PUR transmission.

Figure 5:
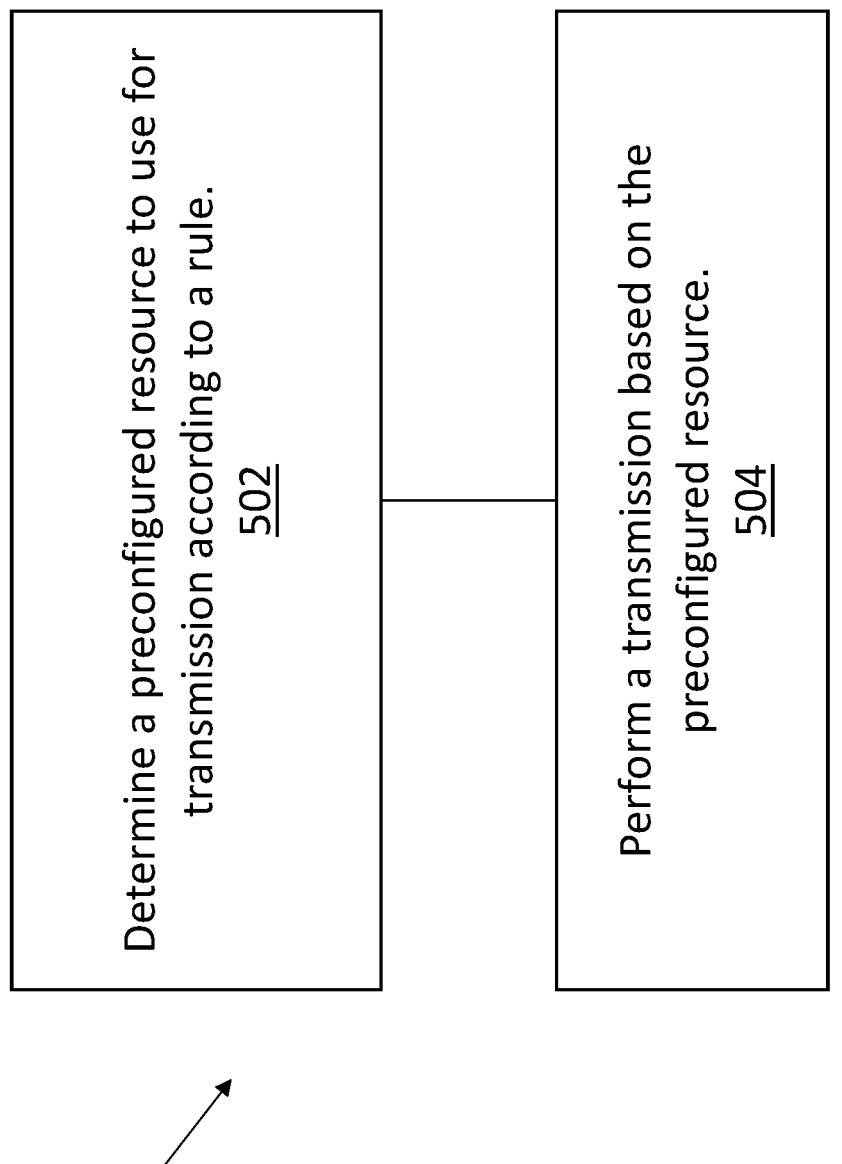
FIG. 5 shows an example method to allocate a PUR resource.

FIG. 5 shows an example method 500 to allocate a PUR resource. At step 502, a UE can determine a preconfigured resource to use for transmission according to a rule. The preconfigured resources can comprise PUR resources. The preconfigured resources can be configured via an RRC message. The preconfigured resources can correspond to different beams from a BS. The preconfigured resources can be configured according to a relative frequency domain parameter. The rule can specify that the determining is performed in response to switching to a new serving resource, such as a beam switch. At step 504, a UE can perform a transmission based on the preconfigured resource.

Case 2: When to Update PUR Resource

For case 1, option 1 above, when to update a PUR resource should be considered since there is no UL grant before a PUR transmission.

The beam coverage of a satellite can be either earth moving or earth fixed. For the earth moving case, the beam coverage moves along with the satellite. A UE may experience several beam switches between two PUR occasions. To accommodate the frequent switches, a large resource overhead is required, which minimizes the advantages of PUR. Therefore, a fallback to RACH/EDT can be performed when the UE is switched to a beam served by an earth moving satellite.

For the earth fixed case, the satellite steers its beam on a fixed area, and beam switching occurs less often. Moreover, beam switching is only likely to happen in certain cases, e.g., when the satellite is moving out of sight. Therefore, a BS may only need to update a PUR resource allocated to a UE during feedback to a PUR transmission when certain conditions are satisfied, e.g., when elevation angle is below a threshold.

Case 3: Actions at UE Side

Considering the above cases, a UE can perform the following procedures before a PUR transmission:

a. Decode System Information Block (SIB) for BS Information

In NTNs, a BS will broadcast satellite information to enable autonomous pre-compensation at an UE. For GEO satellites, a traditional PUR mechanism can be applied. For earth moving LEO satellites, a fallback to RACH/EDT can be performed. For earth fixed LEO satellites, the following procedures can be performed.

b. Judge Whether there is Feasible PUR Resource

If there is no feasible PUR resource for a current beam, a fallback to RACH/EDT can be performed. Otherwise, a feasible resource for UL transmission can be selected.

c. Judge Whether Beam Switch Condition is Satisfied

If a UE finds the beam switch condition is satisfied, a beam switch request is attached to UL data in a PUR transmission. The beam switch condition can be one or more of the following:

a) An elevation angle is below a preset threshold.

b) A beam switch timer is expired.

c) Reference signal received power (RSRP) is below a preset threshold.

The UE will switch to the new beam after receiving a beam switch indication from the BS.

Figure 6:
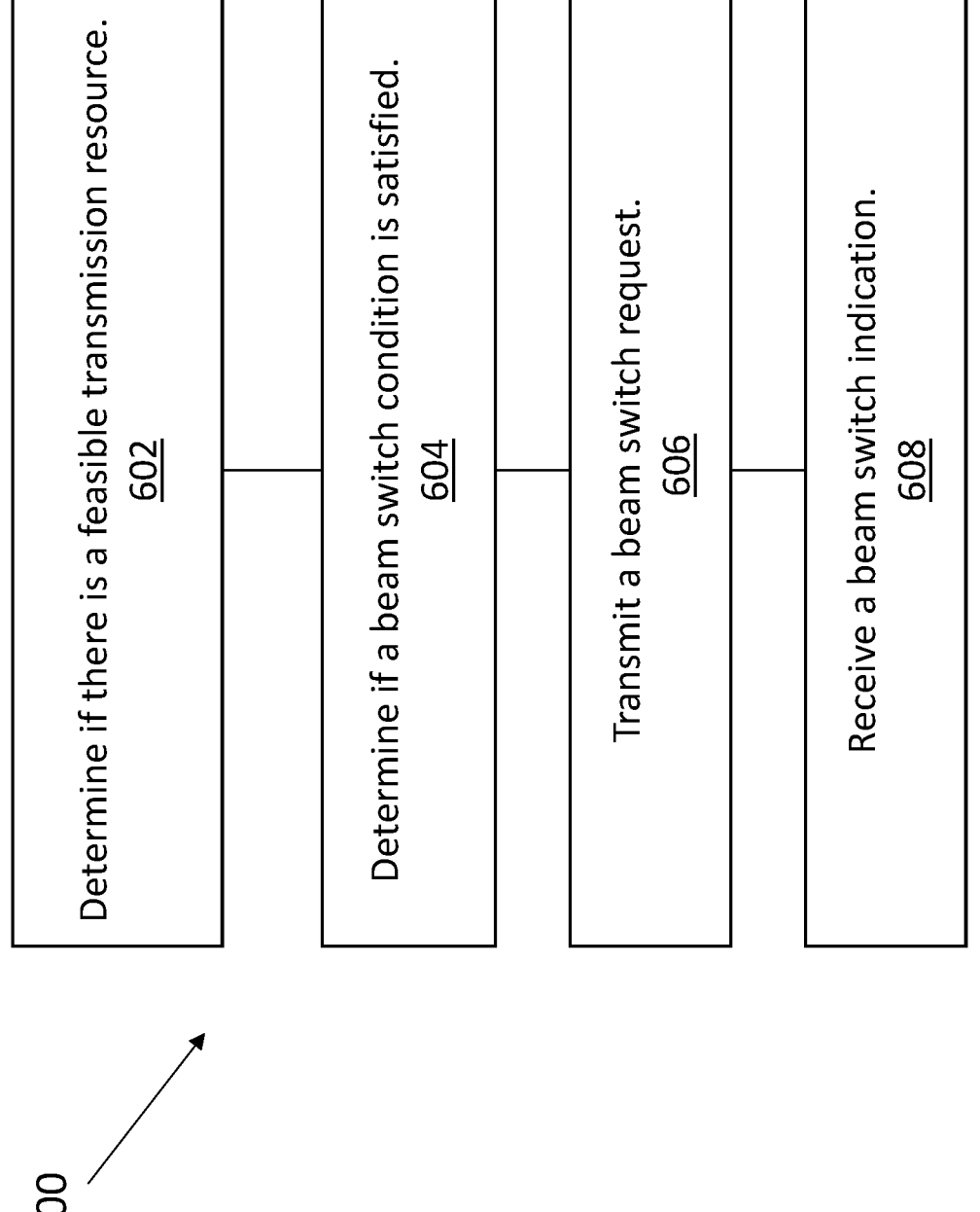
FIG. 6 shows an example method performed by a UE.

FIG. 6 shows an example method 600 performed by a UE. At step 602, a UE determines if there is a feasible transmission resource. The transmission resource can be a PUR resource. If there is no feasible transmission resource, the UE can fallback to RACH/EDT. If there is a feasible transmission resource, then the UE determines if a beam switch condition is satisfied at step 604. The beam switch condition can be that an elevation angle is below a threshold, that a beam switch timer is expired, or RSRP is below a threshold value. If a beam switch condition is satisfied at step 604, then the UE can transmit a beam switch request at step 606. The beam switch request, for example, can be attached to UL data in a PUR transmission. At step 608, the UE can receive a beam switch indication from a BS. The beam switch indication can cause the UE to switch to a new beam.

Case-4: Actions at BS Side

In earth fixed LEO, a BS can transmit a beam switch indication to a UE in the feedback of a PUR occasion when one or more of following conditions are satisfied:

a. A beam switch request from the UE is received.

b. The BS proactively performs a beam switch.

A BS may proactively perform beam switch in certain cases. For example:

a) The BS finds that another satellite could provide better service, even if the current satellite still works.

b) Too many UEs are served in a current beam. The BS could switch some edge UEs to other beams to mitigate congestion.

c) The beam switch conditions in case 3, above, are satisfied, but the UE does not request a beam switch.

If case 1, option 1 is adopted, a BS will configure a PUR resource for a new beam to a UE in addition to transmitting a beam switch indication in the feedback and release the PUR resource for the previous beam. If case 1, option 2 is adopted, the BS only needs to transmit a beam switch indication.

Figure 7:
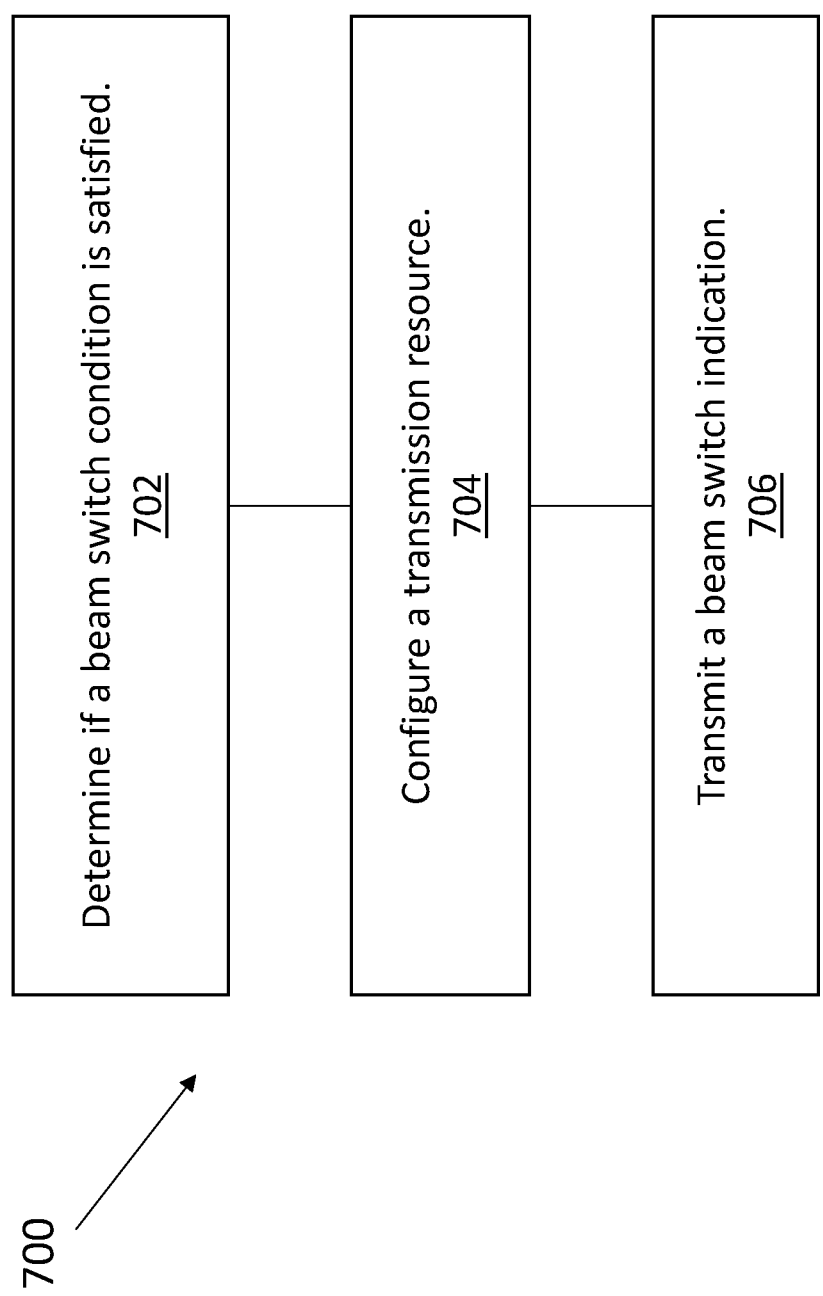
FIG. 7 shows an example method performed by a BS.

FIG. 7 shows an example method 700 performed by a BS. At step 702, a BS determines if a beam switch condition is satisfied. In some embodiments, the BS can be airborne, such as an earth-fixed LEO satellite. The beam switch condition can be receiving a beam switch request from a UE.

The beam switch condition can be determining a satellite provides better service than currently provided, determining that a level of congestion at the BS is too high, that an elevation angle is below a threshold, that a beam switch timer is expired, RSRP is below a threshold value, or another condition. If a beam switch condition is satisfied, then the BS configures a transmission resource at step 704. The transmission resource can be a PUR resource corresponding to a new beam for a UE. Note that if transmission resources are already pre-allocated at a UE, then the BS may not have to configure a transmission resource at step 704. At step 706, the BS transmits a beam switch indication to the UE.

Embodiment 3

In PUR, TA can be updated by the following methods:
TA command MAC CE: The DL data after a PUR transmission may contain a TA command MAC CE that adjusts TA for a latter UL transmission.
Physical layer feedback: If a BS does not have data to be transmitted after receiving a PUR transmission, a layer-1 acknowledgment (L1-ACK) carried in PDCCH, which is only related to the physical layer, could be utilized for fast feedback. In L1-ACK, TA and repetition number can be updated for a latter UL transmission.

In above methods, the interval between a parameter update and a next PUR transmission can be tens of seconds. Due to the large interval between update and application of TA, pur-TimeAlignmentTimer and pur-RSRP-ChangeThreshold are configured to handle TA validation and avoid significant misalignment between applied and actual TA values. Because of the relative static relation between IoT devices and a BS in traditional terrestrial networks, the TA value can be valid for a long time.

In GEO scenarios, the positions of ground UEs and satellites are relatively static, which is similar to a terrestrial network. As a result, a large interval between configuration and application of TA will not lead to significant misalignment. However, in LEO, the high speed of satellites can lead to fast TA variations, so that the updated TA can be expired at a next PUR transmission. In this case, the traditional BS-dominated TA adjustment is no longer needed. Instead, the following two methods can be considered:
a. Option-1: Open-loop method. A UE can utilize open-loop methods to obtain TA, e.g., calculating transmission delay according to position and mobility information of a satellite and the UE through geometric formulas, for each PUR occasion.
b. Option-2: Hybrid method. A UE can combine closed and open-loop methods to update TA. For example, a UE utilize open-loop methods to update TA as in option-1 above. When a TA command is received, the UE can additionally add the adjustment to correct residual error. Thus, a hybrid method can be more robust than pure open-loop methods.

Figure 8:
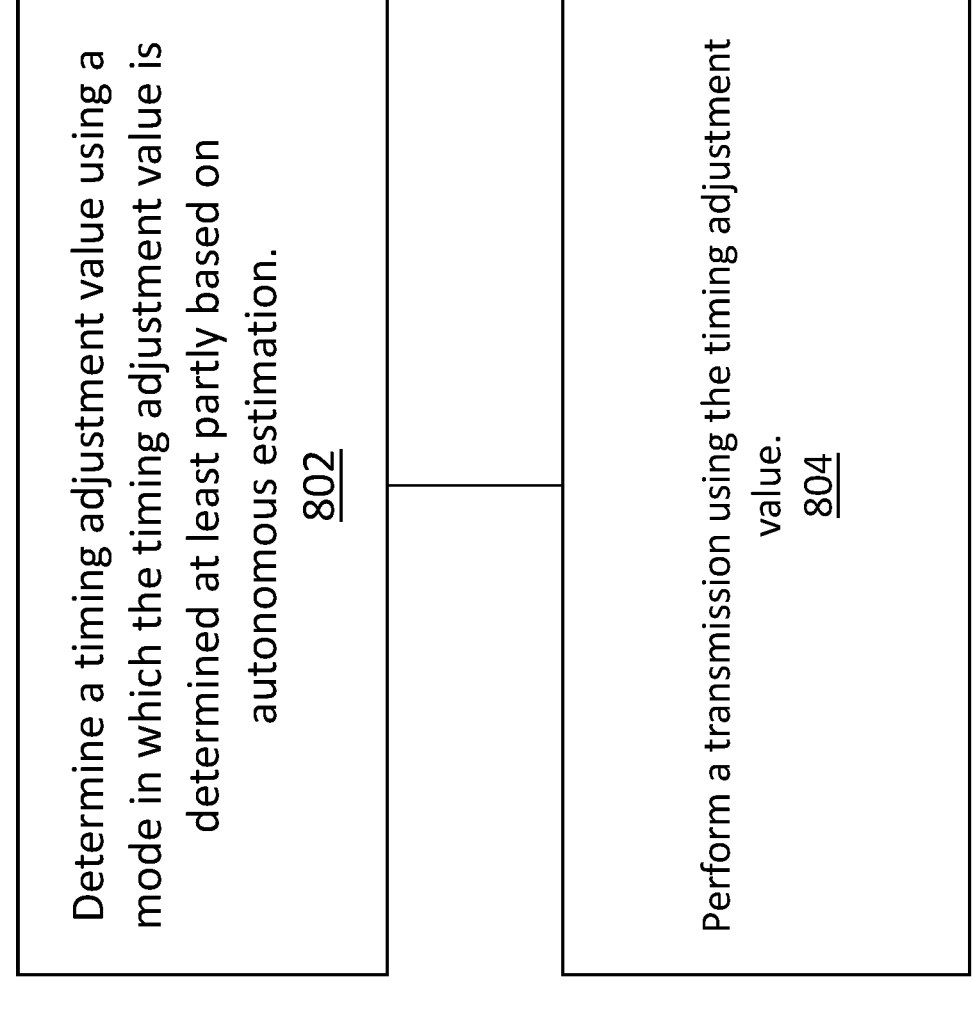
FIG. 8 shows an example open-loop method to update TA.

FIG. 8 shows an example open-loop method 800 to update TA. At step 802, a timing adjustment value is determined using a mode in which the timing adjustment value is determined at least partly based on autonomous estimation. The autonomous estimation of the timing adjustment value can be based on position information or mobility information of a UE or network device, such as if the network device is on a satellite. In some embodiments, the timing adjustment value can be determined based on calculating a transmission delay between a satellite and a UE. For example, the transmission delay can be calculated by geometric methods, or by comparing global navigation satellite system (GNSS) timestamps at a UE and BS with regards to a reference time. At step 804, a transmission is performed using the timing adjustment value. For example, a TA can be updated according to the timing adjustment value, and the transmission can include the updated TA in a PUR transmission.

Figure 9:
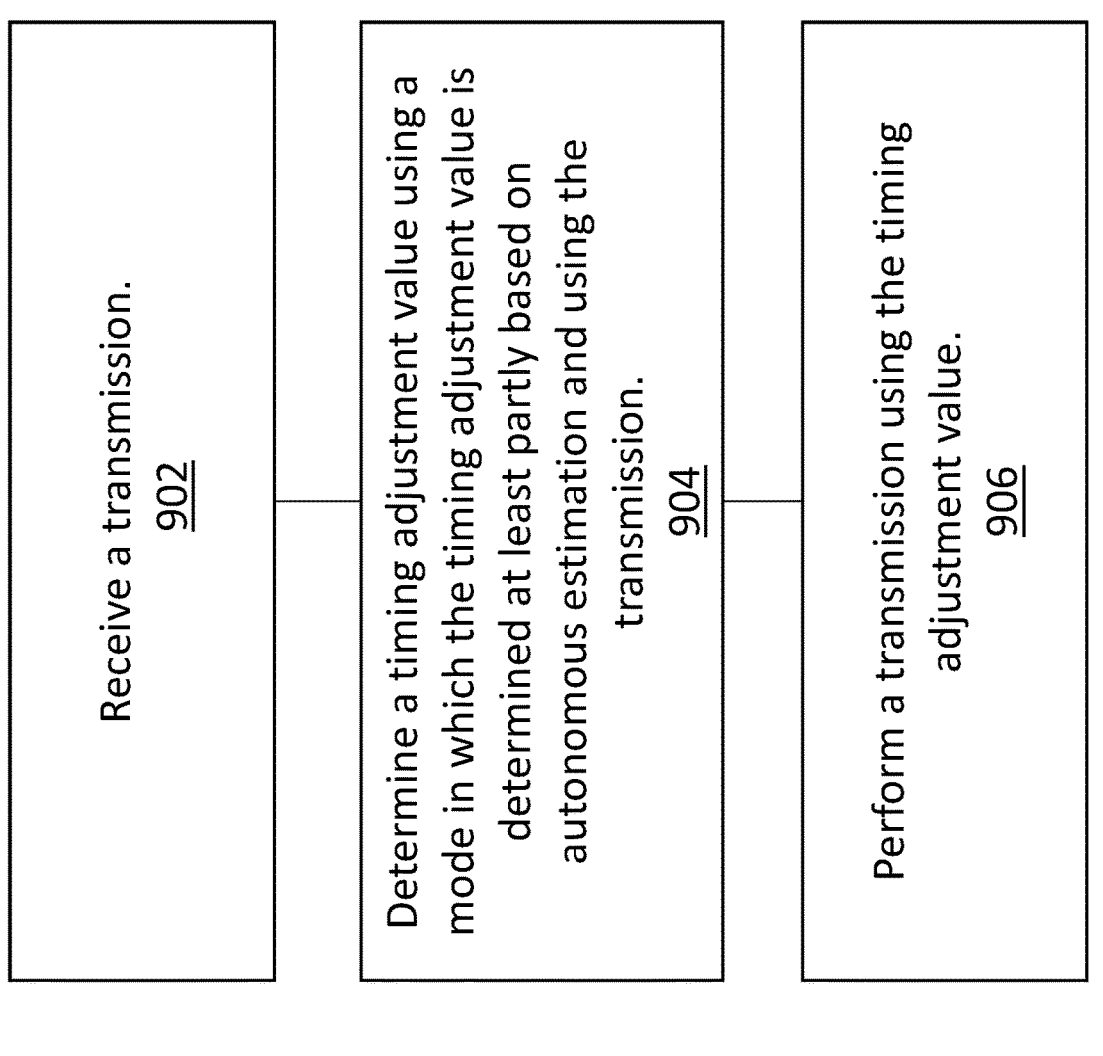
FIG. 9 shows an example hybrid method to update TA.

FIG. 9 shows an example hybrid method 900 to update TA. At step 902, a transmission is received from a BS. The transmission can include a timing adjustment command. At step 904, a timing adjustment value is determined using a mode in which the timing adjustment value is determined at least partly based on autonomous estimation and using the transmission received from the BS. For example, the timing adjustment value can be determined similarly to step 802, except the timing adjustment value can be further adjusted according to the timing adjustment command received at step 902. At step 906, a transmission can be performed using the timing adjustment value. Step 906 can be similar to step 804 above.

The application of open-loop or hybrid TA maintenance in PUR can be configured by:
a. RRC Signaling
    a) In RRC configuration of PUR, an additional parameter can be added to indicate the application of open-loop or hybrid TA maintenance.
    b) In RRC configuration of PUR, the spare status of an existing parameter can be reused to indicate the application of open-loop/hybrid TA maintenance. For example, IE RSRP-Change Threshold has several spare statuses as shown in the following:
    RSRP-ChangeThresh-r16::=ENUMERATED {dB4, dB6, dB8, dB10, dB14, dB18, dB22, dB26, dB30, dB34, spare6, spare5, spare4, spare3, spare2, spare1}
        A spare status can be used for indication of open-loop or hybrid TA maintenance. In some embodiments, a UE can determine that open-loop or hybrid TA maintenance methods should be applied when a specific configuration pattern of TA validity parameters is detected.

Figure 10:
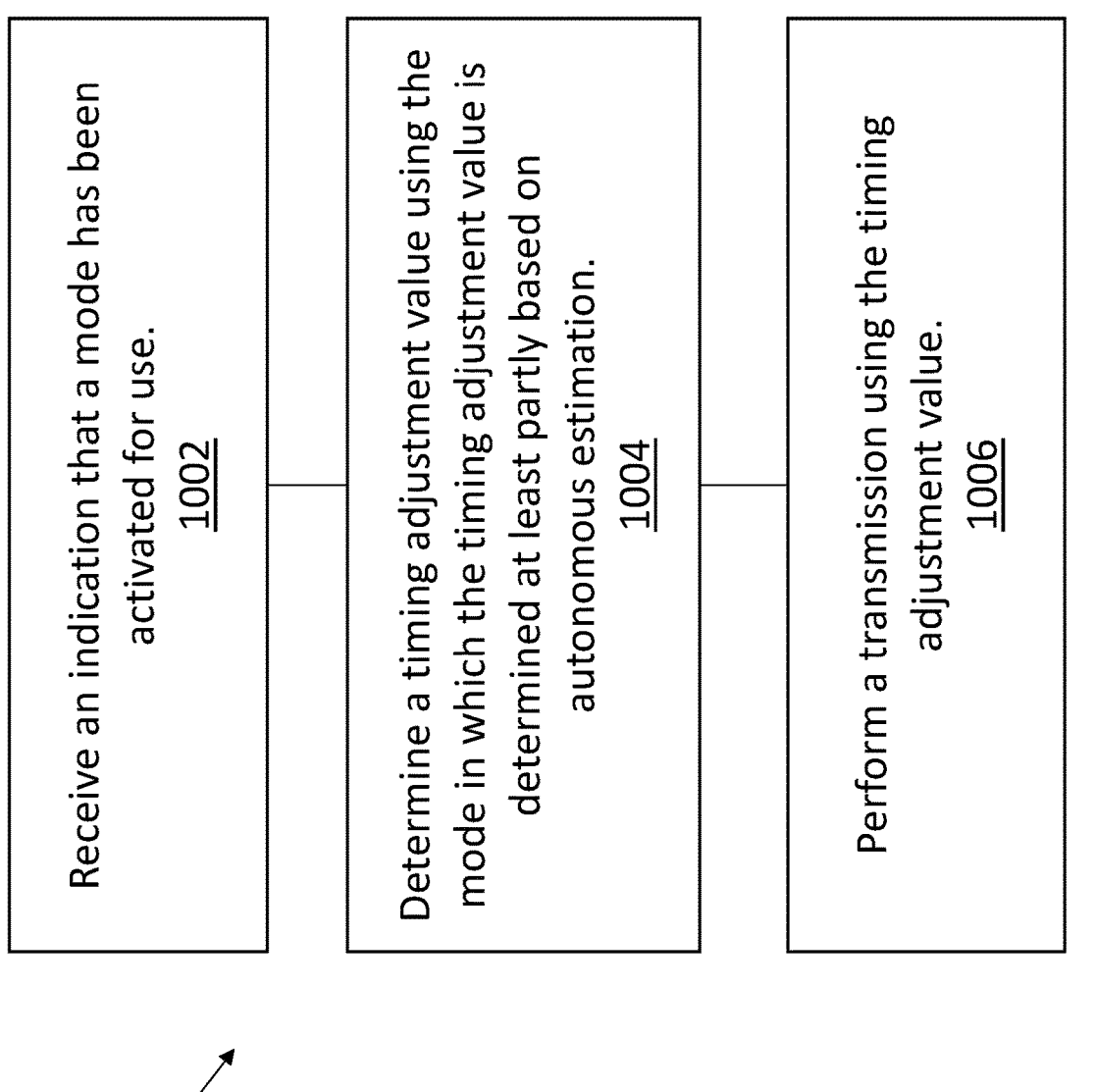
FIG. 10 shows an example method to update TA using radio resource control (RRC) signaling.

FIG. 10 shows an example method 1000 to update TA using RRC signaling. At step 1002, an indication that a mode has been activated for use is received. The indication can signal to a UE to use open-loop or hybrid TA maintenance. The indication can be received in an RRC message. The indication can use a dedicated field in the RRC message, for example by an additional parameter added during RRC configuration of a PUR resource. The indication can reuse an existing parameter, such as a spare status field in RSRP-Change Threshold. In some embodiments, a UE can determine that a mode has been activated in response to a configuration pattern of validity parameters, such as a specific configuration of RSRP-Change Threshold, or other parameters. At step 1004, a timing adjustment value is determined using the mode activated by the indication in step 1002, in which the timing adjustment value is determined at least partly based on autonomous estimation. The timing adjustment value can be determined by open-loop or hybrid methods. For example, step 1004 can be similar to steps 802 or to 904, where the timing adjustment value is determined using a transmission from a BS. At step 1006, a transmission is performed using the timing adjustment value. This transmission can be performed similarly to steps 804 and 906.
b. Broadcast BS Information
    A UE can determine whether or not to apply traditional TA maintenance according to BS information. For example, if the UE identifies it is served by a LEO satellite, open-loop or hybrid TA maintenance can be applied instead of traditional closed-loop TA maintenance. For GEO NTNs, the traditional mechanism can be applied. The following methods may be used for the broadcast:

a) Reuse or add a bit field in MIB or SIB (master information block or system information block) to indicate BS information.

b) Reuse or add a bit field in MIB or SIB to indicate a BS type. The information corresponding to the BS type can be pre-stored at a UE.

c) Implicitly indicate BS type to a UE by a status information, such as Cell ID, public land mobile network (PLMN) arrangement, frequency band, SIB type, etc. The status information corresponding to the BS type can be pre-stored at the UE.

Figure 11:
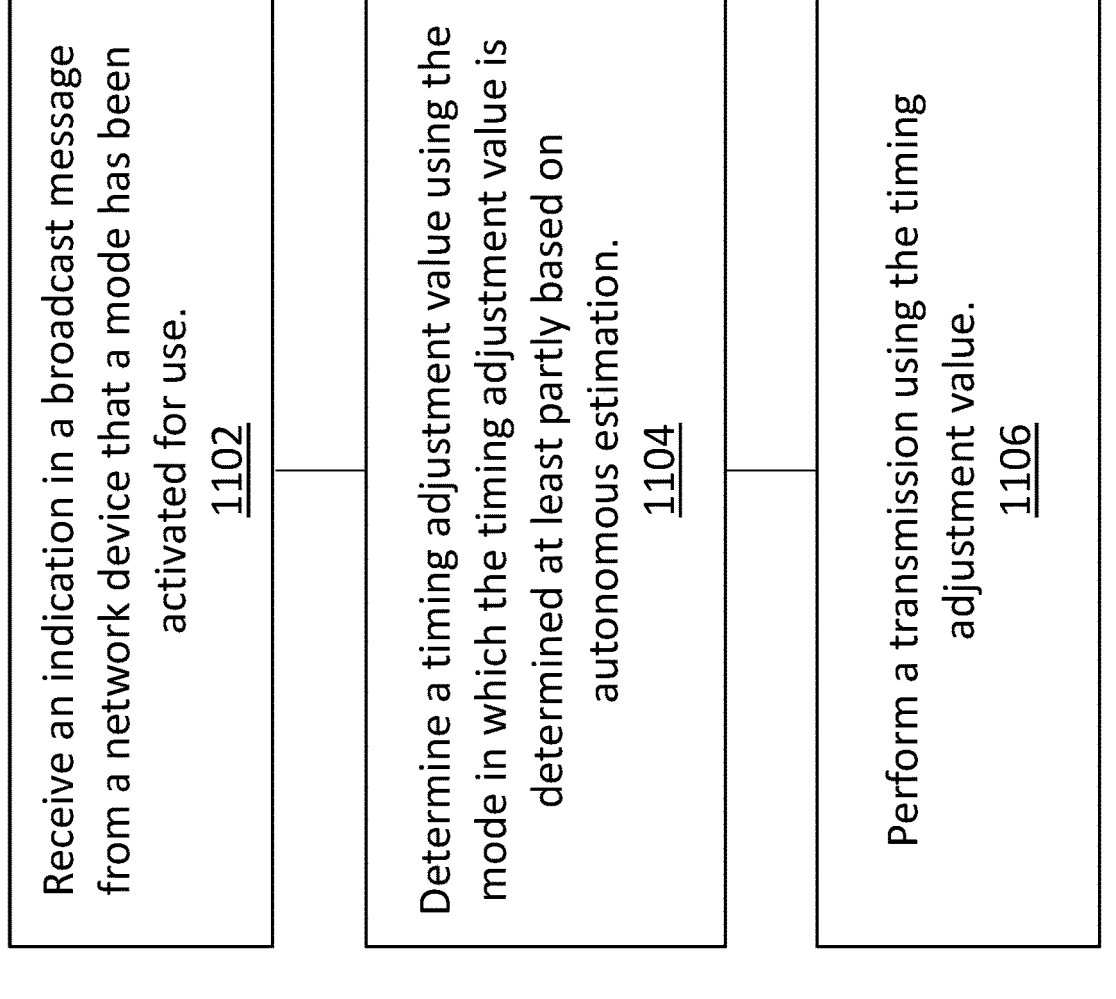
FIG. 11 shows an example method to update TA using BS information.

FIG. 11 shows an example method 1100 to update TA using BS information. At step 1102 an indication is received in a broadcast message from a BS that a mode has been activated for use. The indication can signal that the BS is a non-terrestrial device, such as a LEO satellite, or a high mobility device. The indication can use a new field, such as in MIB or SIB of the broadcast message. The indication can reuse an existing field, such as in MIB or SIB. The indication can be based on information indicative of a type of the network device, such as a cell identifier, an arrangement of a PLMN, or a frequency band of operation or a type of SIB. At step 1104, a timing adjustment value is determined using the mode in which the timing adjustment value is determined at least partly based on autonomous estimation. Step 1104 can be similar to step 1004. The timing adjustment value can be determined using open-loop or hybrid methods, similar to steps 802 and 904. At step 1106, a transmission using the timing adjustment value is performed. This transmission can be performed similarly to steps 804, 906, and 1006.

Note that the traditional closed-loop TA maintenance and TA validation mechanisms are no longer used when enabling pure open-loop TA maintenance. As a result, if a UE is configured with pure open-loop TA adjustment methods, it should ignore the TA commands from BS, including the ones in MAC CE and DCI. Moreover, pur-TimeAlignmentTimer should not be configured, which disables the traditional TA validation mechanism, since the validity of TA is determined by UE. If hybrid TA maintenance is enabled, the TA commands from BS can still be used. But the validation mechanism should also be disabled, since the TA command is only used for error correction. The open-loop portion of a hybrid method can handle the TA variation because of the large delay between receiving a TA command and a PUR transmission.

Embodiment 4: Measurement Reporting

In current measurement reporting, including in NR and NB-IoT/eMTC, the measurement is mostly conducted on a certain frequency resource only. For example, in NR, the measurement is conducted on a single active BWP. In NB-IoT, it is conducted on an anchor carrier for initial access, or the carrier in which the PDCCH order-initiated PRACH (physical random access channel) is received.

For service over a satellite, some frequency reuse mechanism, such as frequency division multiplexing (FDM), is considered to alleviate the interference among beams. In some embodiments, different frequencies can be directly mapped to satellite beams from an implementation perspective (e.g., BWP to beam in NR, anchor/non-anchor carrier to beam in NB-IoT, narrowband to beam in eMTC). But enhancements are needed in order to enable a beam switching/beam quality measurement report.

Case 1: Enable Measurement Report for Multiple Resources

In order to let a BS identify which beam serves a UE best, the UE should report the measurements for multiple beams to the BS. Since beams are mapped with different frequency resources, we propose:

A UE can report measured RSRP, signal-to-interference-plus-noise ratio (SINR), or reference signal received quality (RSRQ) for a number of resources or reference signals (RSs) (if RS is configured per target resource). Here, the reference signal (RS) can be one of: synchronization RS, cell specific reference signal (CRS), channel state information reference signal (CSI-RS), or demodulation reference signal (DM-RS).

The number of resources or RSs, X, can be configured as $1 \leq X \leq L$, where the upper bound, L, can be either configured or pre-defined. The value of X can be configured differently for UEs in different coverage levels.

Case 2: Index of Resource/RS in Report

In order to distinguish reported measurements for different resources or RSs, an index is needed. Normally, the index of a resource refers to the frequency domain index of the resource, e.g., bandwidth par identifier (BWP-id) in NR, carrier ID in NB-IoT, and narrowband ID in eMTC. But in some cases, such as for eMTC, the primary synchronization signal (PSS) will switch among different narrowbands in a time-division-multiplexing (TDM) manner, and time information, including slot ID, subframe ID, and frame ID can also be considered for report.

In some embodiments, a different RS is configured per frequency resource, and a report of RS index is enough. Otherwise, in some embodiments, one RS can be configured with multiple frequency resources, and a joint report of RS index and resource index can be preferred.

Case 3: Container to Carry the Measurement

The report information can be used by a BS to identify the best serving beam or resource for each UE. The information can be carried in: Msg-A for a 2-step RACH, Msg-3 for a 4-step RACH, or PUSCH carrying UCI (periodically, semi- or DCI triggered).

Figure 12:
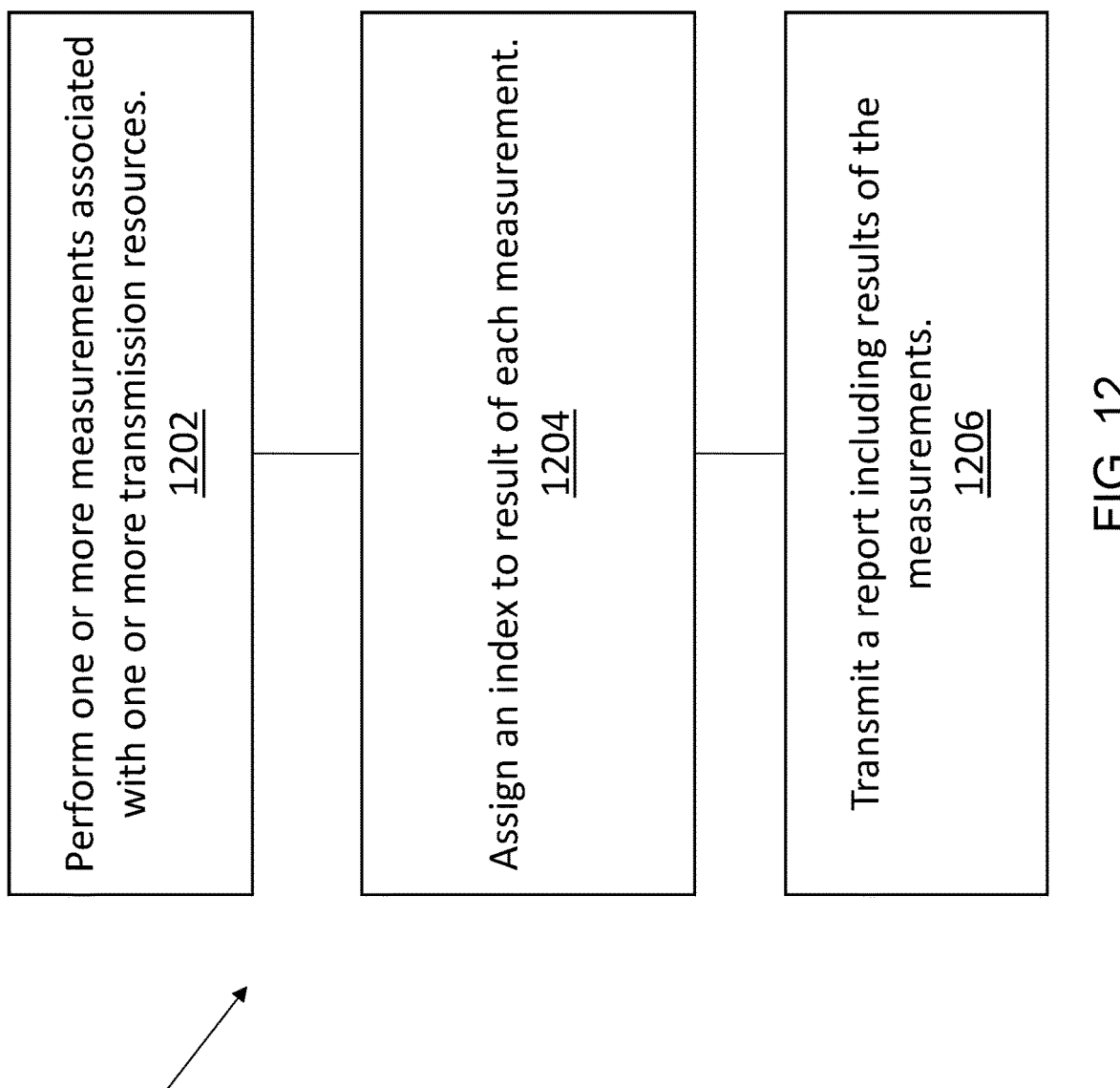
FIG. 12 shows an example method of reporting measurements.

FIG. 12 shows an example method 1200 of reporting measurements. At step 1202 one or measurements is performed, each measurement of the one or more measurements associated with a transmission resource of one or more transmission resources. In some embodiments, each measurement is associated with a different transmission resource. The transmission resource can be, for example, a BWP, an anchor carrier, a non-anchor carrier, a narrowband, a slot, a frame, or a subframe. The transmission resource can be a time domain resource or a frequency domain resource. For example, each measurement can be of a different frequency domain resource. In another example, each transmission resource can be configured with a different RS, and each measurement can be of a different RS. The RS can be, for example, a synchronization RS, a CRS, a CSI-RS, a DM-RS, or another RS. Each measurement can be of RSRP, SINR, RSRQ, or another suitable parameter indicative of beam or signal quality. Each measurement can include any number or combination of suitable parameters. For example, a first measurement can be of RSRP and a second measurement can be of SINR and RSRQ. In another example, a first and second measurement can both be of RSRP. The number of reported measurement results can be between one and an upper bound, where the upper bound is configured or pre-defined. The number of reported measurement results can be selected based on a coverage level.

The method can assign an index to the result of each measurement at step 1204. The index can include an RS index, a resource index, or both an RS index and a resource index. For example, if a different RS is configured for each transmission resource, the index can include an RS index without a resource index. In another example, if one RS can be configured with multiple transmission resources, the index can include both an RS index and a resource index. In some embodiments, the index can include a frequency domain index, such as BWP-id, carrier ID, or narrowband ID. In some embodiments, the index can include a time domain index, such as slot ID, frame ID, or subframe ID.

At step 1206, a report is transmitted including results of the one or more measurements. For example, the report can be transmitted to a BS in an NTN and used by the BS to identify a best beam or resource for a UE. The report can be transmitted in any suitable container, such as Msg-A for a 2-step RACH, Msg-3 for a 4-step RACH, or a PUSCH carrying UCI. The report can be periodic, semi-periodic, or aperiodic, such as triggered by DCI.

Some embodiments may preferably incorporate the following solutions as described herein.

For example, the solutions listed below may be used by wireless device implementations for implementing an open-loop or a hybrid mechanism for TA maintenance as described herein.

1. A method of wireless communication (e.g., method 800 described in FIG. 8), comprising: determining (802), by a wireless device configured to communicate with a network device using preconfigured transmission resources, a timing adjustment value for communication with the network device using a mode in which the timing adjustment value is determined at least partly based on autonomous estimation by the wireless device; and causing the wireless device to perform a transmission using the timing adjustment value (804).

2. The method of solution 1, wherein the autonomous estimation of the timing adjustment value is based on a position information or a mobility information of the network device.

3. The method of any of solutions 1-2, wherein the timing adjustment value is further determined using a transmission received from the network device (e.g., method 900 described in FIG. 9, at step 904).

4. The method of solution 3, wherein the transmission received from the network device includes a timing adjustment command.

5. The method of any of solutions 1-4, wherein the timing adjustment value is determined in response to receiving an indication from the network device that the mode has been activated for use (e.g., method 1000 described in FIG. 10, at step 1002).

6. The method of solution 5, wherein the indication is received in a radio resource connection (RRC) message.

7. The method of solution 5, wherein the indication uses a dedicated field in the RRC message.

8. The method of solution 5, wherein the indication re-uses an existing field in the RRC message.

9. The method of solution 8, wherein the existing field comprises a status field of an information element (IE).

10. The method of solution 9, wherein the IE includes a RSRP-Change Threshold IE and/or a timer.

11. The method of solutions 8-10, wherein the wireless device determines that the mode has been activated responsive to a configuration pattern of validity parameters.

12. The method of solutions 5-11, wherein the indication is received in a broadcast message from the network node (e.g., method 1100 described in FIG. 11, at step 1102).

13. The method of solution 12, wherein the indication signals that the network device is a non-terrestrial network device or a high mobility device.

14. The method of any of solutions 12-13, wherein the indication uses a new field in a system information block of the broadcast message.

15. The method of any of solutions 12-13, wherein the indication re-uses an existing field in a system information block of the broadcast message.

16. The method of solution 5, wherein the indication is based on information indicative of a type of the network node.

17. The method of solution 16, wherein the information includes a cell identifier or an arrangement of a public land mobile network, or a frequency band of operation or a type of system information block transmitted by the network device.

For example, the solutions listed below may be used by wireless device implementations for handling of frequent beam switches (e.g., switching of transmission resources) with few fallback to RACH, particularly for option 1 described above.

18. A method (e.g., method 400 as described in FIG. 4) of wireless communication, comprising: receiving (404), by a user device configured to perform transmissions according to a first configuration of preconfigured resources used for transmission, a second configuration of preconfigured resources used for transmission; and performing (406) communication by the user device using resources from the second configuration of preconfigured resources used for transmission responsive to occurrence of an event.

19. The method of solution 18, wherein the event comprises a serving resource switch performed by the user device.

20. The method of any of solutions 18-19, wherein the second configuration is received by the user device due to a request by the user device, wherein the request is made by the user device based on an operational parameter (e.g., the beam switch request at step 606 in FIG. 6).

21. The method of solution 20, wherein the request is transmitted by the user device along with a transmission in a preconfigured uplink resource (PUR) transmission (402).

22. The method of solution 21, wherein the second configuration is received in a feedback to the PUR transmission.

23. The method of any of solutions 20-22, wherein the operational parameter comprises an elevation angle of the user device, and wherein the request is made due to the elevation angle being below a threshold level.

24. The method of any of solutions 20-22, wherein the operational parameter comprises a timer, and wherein the request is made due to an expiration of the timer.

25. The method of any of solutions 20-22, wherein the operational parameter comprises a reference signal received power (RSRP), and wherein the request is made due to the RSRP being below a threshold level.

For example, the solutions listed below may be used by wireless device implementations for handling of frequent beam switches (e.g., switching of transmission resources) with few fallback to RACH, particularly for option 1 described above and further for resource allocation method for CG to handle frequent beam switches.

26. A method (e.g., method 500 described in FIG. 5) of wireless communication, comprising: determining (502), by a user device configured to perform transmissions according to one of multiple configurations of preconfigured resources, a preconfigured resource to use for transmission according to a rule; and performing (504) a transmission to a network based on the preconfigured resource determined according to the rule.

27. The method of solution 26, wherein the rule specifies that the determining is performed responsive to switching to a new serving resource.

28. The method of any of solutions 26-27, wherein the preconfigured resources are configured according to a relative frequency domain resource parameter.

29. The method of any of solutions 26-28, wherein the preconfigured resources comprise preconfigured uplink resources (PUR).

30. The method of solution 29, wherein PUR are configured via a radio resource control (RRC) message.

31. The method of any of solutions 26-28, wherein the preconfigured resources comprise configured grant (CG) resources.

32. The method of solution 31, wherein the CG resource is configured via physical layer signaling.

For example, the solutions listed below may be used by wireless device implementations for measurement reporting, e.g., as described in embodiment 4.

33. A method (e.g., method 1200 described in FIG. 12) of wireless communication, comprising: performing (1202), by a wireless device configured to communicate with a network device, one or more measurements, each measurement of the one or more measurements associated with a transmission resource of one or more transmission resources; and transmitting (1206) a report including results of the one or more measurements to the network device.

34. The method of solution 33, wherein each measurement is associated with a different transmission resource.

35. The method of solution 33, wherein one or more reference signals (RS) is associated with each transmission resource of the plurality of transmission resources.

36. The method of solution 35, wherein the RS is a synchronization RS, cell specific reference signal (CRS), channel state information reference signal (CSI-RS), or demodulation reference signal (DM-RS).

37. The method of solution 33, wherein the transmission resource includes a bandwidth part (BWP), an anchor carrier, a non-anchor carrier, a narrowband, a slot, a frame, or a subframe.

38. The method of solution 33, wherein the results of the one or more measurements are of received signal received power (RSRP), signal-to-interference-plus-noise ratio (SINR), or reference signal received quality (RSRQ).

39. The method of solution 33, wherein the results of the one or more measurements include an index of measured transmission resource or a reference signal (RS) index.

40. The method of solution 33, wherein the report is transmitted in Msg-A, Msg-3, or a physical uplink shared channel (PUSCH).

41. The method of solution 33, wherein the number of reported results is less than or equal to an upper bound, the upper bound being configured or predefined.

42. The method of solution 41, wherein the number of reported results is selected based on a coverage level.

43. A method of wireless communication, comprising: transmitting, by a network device to a wireless device configured to communicate with the network device using preconfigured transmission resources, a timing adjustment information using which the wireless device determines a timing adjustment value based on autonomous estimation by the wireless device; and receiving from the wireless device a transmission that uses the timing adjustment value.

44. The method of solution 43, wherein the autonomous estimation of the timing adjustment value is based on a position information or a mobility information of the network device.

45. The method of any of solutions 43-44, further comprising: transmitting, by the network device to the wireless device, an indication that a mode has been activated for use, wherein the wireless device determines the timing adjustment value in response to receiving the indication.

46. The method of solution 45, wherein the indication is transmitted in a radio resource connection (RRC) message.

47. The method of solution 45, wherein the indication uses a dedicated field in the RRC message.

48. The method of solution 45, wherein the indication re-uses an existing field in the RRC message.

49. The method of solution 48, wherein the existing field comprises a status field of an information element (IE).

50. The method of solution 49, wherein the IE includes a RSRP-Change Threshold IE and/or a timer.

51. The method of solutions 48-50, wherein the wireless device determines that the mode has been activated responsive to a configuration pattern of validity parameters.

52. The method of solutions 45-51, wherein the indication is transmitted in a broadcast message from the network node.

53. The method of solution 52, wherein the indication signals that the network device is a non-terrestrial network device or a high mobility device.

54. The method of any of solutions 52-53, wherein the indication uses a new field in a system information block of the broadcast message.

55. The method of any of solutions 52-53, wherein the indication re-uses an existing field in a system information block of the broadcast message.

56. The method of solution 45, wherein the indication is based on information indicative of a type of the network node.

57. The method of solution 56, wherein the information includes a cell identifier or an arrangement of a public land mobile network, or a frequency band of operation or a type of system information block transmitted by the network device.

For example, the solutions listed below may be used by a network device for handling of frequent beam switches (e.g., switching of transmission resources) with few fallback to RACH, particularly for option 1 described above.

58. A method of wireless communication, comprising: transmitting, by a network device to a user device configured to perform transmissions according to a first configuration of preconfigured resources used for transmission, a second configuration of preconfigured resources used for transmission; wherein the second configuration of preconfigured resources used for transmission includes resources usable by the user device to perform communication responsive to occurrence of an event.

59. The method of solution 58, wherein the event comprises a serving resource switch performed by the user device.

60. The method of any of solutions 58-59, wherein the second configuration is transmitted by the network device due to a request by the user device, wherein the request is made by the user device based on an operational parameter.

61. The method of solution 60, wherein the request is received by the network device along with a transmission in a preconfigured uplink resource (PUR) transmission.

62. The method of solution 61, wherein the second configuration is transmitted in a feedback to the PUR transmission.

63. The method of any of solutions 60-62, wherein the operational parameter comprises an elevation angle of the user device, and wherein the request is made due to the elevation angle being below a threshold level.

64. The method of any of solutions 60-62, wherein the operational parameter comprises a timer, and wherein the request is made due to an expiration of the timer.

65. The method of any of solutions 60-62, wherein the operational parameter comprises reference signal received power (RSRP), and wherein the request is made due to the RSRP being below a threshold level.

For example, the solutions listed below may be used by network devices for handling of frequent beam switches (e.g., switching of transmission resources) with few fallback to RACH, particularly for option 1 described above and further for resource allocation method for CG to handle frequent beam switches.

66. A method of wireless communication, comprising: transmitting, by a network device to a user device configured to communicate with the network device using one of multiple configurations of preconfigured resources, an indication using which the wireless device determines a preconfigured resource to use for transmission; and receiving, from the wireless device, a transmission that uses the preconfigured resource.

67. The method of solution 66, wherein the indication indicates switching to a new serving resource.

68. The method of any of solutions 66-67, wherein the preconfigured resources are configured according to a relative frequency domain resource parameter.

69. The method of any of solutions 66-68, wherein the preconfigured resources comprise preconfigured uplink resources (PUR).

70. The method of solution 69, wherein PUR are configured via a radio resource control (RRC) message.

71. The method of any of solutions 66-68, wherein the preconfigured resources comprise configured grant (CG) resources.

72. The method of solution 71, wherein the CG resource is configured via physical layer signaling.

For example, the solutions listed below may be used by network devices for implementing measurement reporting, e.g., as described in embodiment 4.

73. A method of wireless communication, comprising: receiving, from a wireless device configured to communicate with a network device, a report including results of one or more measurements, each measurement of the one or more measurements associated with a transmission resource of one or more transmission resources; determining, based on the report, a serving resource to use for transmission to the wireless device.

74. The method of solution 73, wherein each measurement is associated with a different transmission resource.

75. The method of solution 73, wherein a reference signal (RS) is configured for each transmission resource of the plurality of transmission resources.

76. The method of solution 75, wherein the RS is a synchronization RS, cell specific reference signal (CRS), channel state information reference signal (CSI-RS), or demodulation reference signal (DM-RS).

77. The method of solution 73, wherein the transmission resource includes a bandwidth part (BWP), an anchor carrier, a non-anchor carrier, a narrowband, a slot, a frame, or a subframe.

78. The method of solution 73, wherein the results of the one or more measurements are of received signal received power (RSRP), signal-to-interference-plus-noise ratio (SINR), or reference signal received quality (RSRQ).

79. The method of solution 73, wherein the results of the one or more measurements include an index of measured transmission resource or a reference signal (RS) index.

80. The method of solution 73, wherein the report is received in Msg-A, Msg-3, or a physical uplink shared channel (PUSCH).

81. The method of solution 73, wherein the number of reported measurements is less than or equal to an upper bound, the upper bound being configured or predefined.

82. The method of solution 81, wherein the number of reported measurements is selected based on a coverage level.

83. An apparatus for wireless communication comprising a processor configured to implement the method of any of solutions 1 to 82.

84. A computer readable medium having code stored thereon, the code when executed by a processor, causing the processor to implement a method recited in any of solutions 1 to 82.

Figure 13:
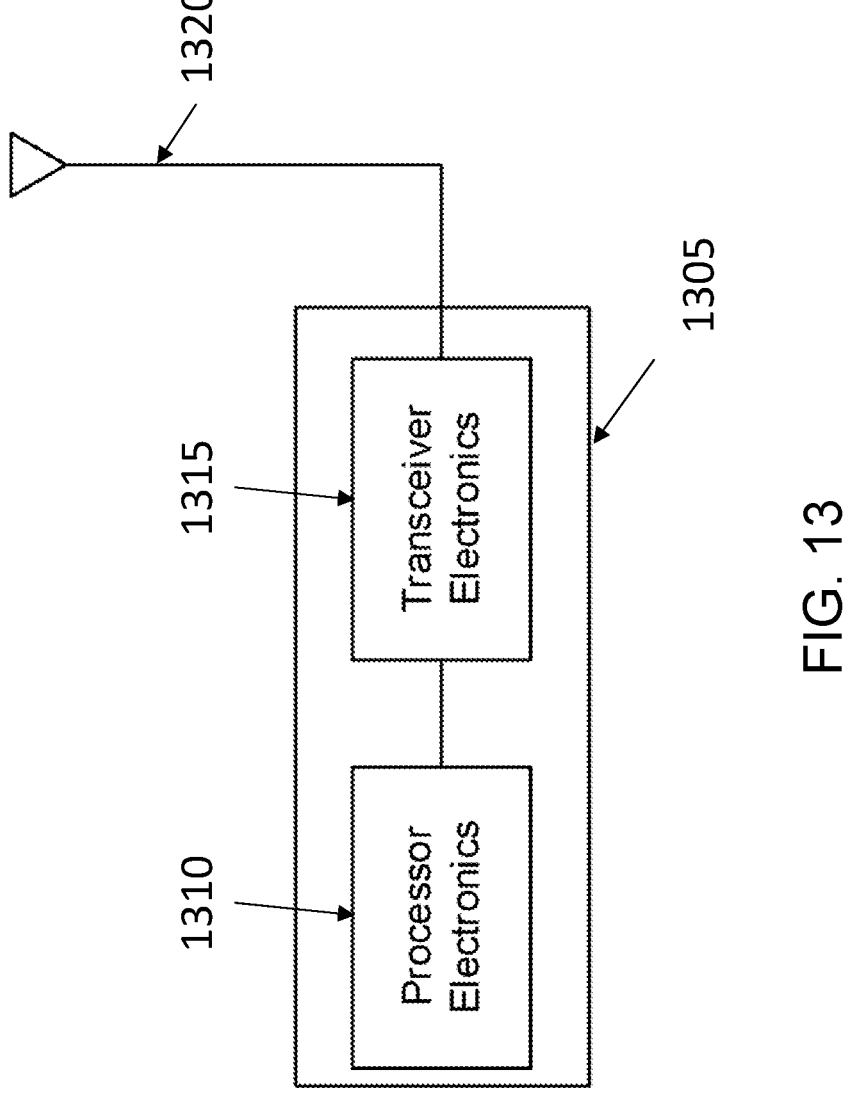
FIG. 13 is a block diagram representation of a portion of an apparatus that can be used to implement methods and/or techniques of the presently disclosed technology.

FIG. 13 is a block diagram representation of a portion of an apparatus, in accordance with some embodiments of the presently disclosed technology. An apparatus 1305 such as a network device or a base station or a wireless device (or UE), can include processor electronics 1310 such as a microprocessor that implements one or more of the techniques presented in this document. The apparatus 1305 can include transceiver electronics 1315 to send and/or receive wireless signals over one or more communication interfaces such as antenna(s) 1320. The apparatus 1305 can include other communication interfaces for transmitting and receiving data. Apparatus 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the apparatus 1305.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:
1. A method of wireless communication, comprising:
receiving, by a wireless device, an indication from a network device, the indication including a configuration pattern of validity parameters;
determining, by the wireless device according to the configuration pattern of validity parameters, activation of a mode for communication with the network device using preconfigured transmission resources;
determining, by the wireless device responsive to activation of the mode, a timing adjustment value for communication with the network device using the mode, wherein the timing adjustment value is determined at least partly based on autonomous estimation by the wireless device, the autonomous estimation being based on a transmission delay between the wireless device and a satellite, wherein the wireless device determines the transmission delay according to position information and mobility information of the satellite; and
causing the wireless device to perform a transmission with the network device using the timing adjustment value and the preconfigured transmission resources.

2. The method of claim 1, wherein the autonomous estimation of the timing adjustment value is based on a position information or a mobility information of the network device.

3. The method of claim 1, wherein the timing adjustment value is further determined using a transmission received from the network device.

4. The method of claim 3, wherein the transmission received from the network device includes a timing adjustment command.

5. The method of claim 1, wherein the indication is received in a radio resource control (RRC) message.

6. The method of claim 5, wherein the indication uses a dedicated field in the RRC message.

7. The method of claim 5, wherein the indication re-uses an existing field in the RRC message.

8. The method of claim 7, wherein the existing field comprises a status field of an information element (IE).

9. The method of claim 8, wherein the IE includes at least one of: a RSRP-Change Threshold IE or a timer.

10. The method of claim 1, wherein the indication is received in a broadcast message from the network device.

11. The method of claim 10, wherein the indication signals that the network device is a non-terrestrial network device or a high mobility device.

12. The method of claim 10, wherein the indication uses a new field in a system information block of the broadcast message.

13. The method of claim 10, wherein the indication re-uses an existing field in a system information block of the broadcast message.

14. The method of claim 1, wherein the indication is based on information indicative of a type of the network device.

15. The method of claim 14, wherein the information includes a cell identifier or an arrangement of a public land mobile network, or a frequency band of operation or a type of system information block transmitted by the network device.

16. The method of claim 1, wherein the mode is an open-loop mode or a hybrid mode.

17. A wireless device configured to communicate with a network device using preconfigured transmission resources, the wireless device comprising:
at least one processor configured to:
receive an indication from a network device, the indication including a configuration pattern of validity parameters;
determine, according to the configuration pattern of validity parameters, activation of a mode for communication with the network device using the preconfigured transmission resources:
determine, responsive to activation of the mode, a timing adjustment value for communication with the network device using the mode, wherein the timing adjustment value is determined at least partly based on autonomous estimation by the wireless device, the autonomous estimation being based on a transmission delay between the wireless device and a satellite, wherein the wireless device determines the transmission delay according to position information and mobility information of the satellite; and
cause the wireless device to perform a transmission with the network device using the timing adjustment value and the preconfigured transmission resources.

18. A method of wireless communication, comprising:
transmitting, by a network device to a wireless device, an indication including a configuration pattern of validity parameters, wherein an activation of a mode for communication with the network device is determined using preconfigured transmission resources according to the configuration pattern of validity parameters;

transmitting, by the network device to the wireless device, a timing adjustment information, wherein, responsive to the activation of the mode, a timing adjustment value is determined based on autonomous estimation by the wireless device, the autonomous estimation being based on a transmission delay between the wireless device and a satellite, wherein the transmission delay is determined according to position information and mobility information of the satellite; and receiving, from the wireless device, a transmission with the network device that uses the timing adjustment value and the preconfigured transmission resources.

19. A network device, comprising:

at least one processor configured to:

transmit, via a transceiver to a wireless device, an indication including a configuration pattern of validity parameters, wherein an activation of a mode for communication with the network device is determined using preconfigured transmission resources according to the configuration pattern of validity parameters;

transmit, via the transceiver to the wireless device, a timing adjustment information, wherein, responsive to the activation of the mode, a timing adjustment value is determined based on autonomous estimation by the wireless device, the autonomous estimation being based on a transmission delay between the wireless device and a satellite, wherein the transmission delay is determined according to position information and mobility information of the satellite; and receive, via the transceiver from the wireless device, a transmission with the network device that uses the timing adjustment value and the preconfigured transmission resources.

* * * * *